(12) United States Patent
Davis et al.

(10) Patent No.: US 10,099,655 B2
(45) Date of Patent: Oct. 16, 2018

(54) WHEEL FASTENER ALARM

(71) Applicant: Maclean-Fogg Company, Mundelein, IL (US)

(72) Inventors: David J. Davis, Rochester, MI (US); Kryzysztof Misztur, Streamwood, IL (US); Christian Muehlich, Whitewater, WI (US); Robert E. Whitney, Libertyville, IL (US); Larry J. Wilson, Commerce Township, MI (US); Marcus A. Zagorniak, Charlotte, NC (US); Steven R. Fister, Tucson, AZ (US)

(73) Assignee: MACLEAN-FOGG COMPANY, Mundelein, IL (US)

( * ) Notice: Subject to any disclaimer, the term of this patent is extended or adjusted under 35 U.S.C. 154(b) by 0 days.

(21) Appl. No.: 15/788,204

(22) Filed: Oct. 19, 2017

(65) Prior Publication Data
US 2018/0118158 A1    May 3, 2018

Related U.S. Application Data (60) Provisional application No. 62/414,444, filed on Oct. 28, 2016.

(51) Int. Cl.
| | |
|---|---|
| *B60R 25/10* | (2013.01) |
| *B60B 3/16* | (2006.01) |
| *B60C 9/00* | (2006.01) |
| *B60R 25/24* | (2013.01) |
| *F16B 37/14* | (2006.01) |
| *F16B 41/00* | (2006.01) |
| *G08B 25/00* | (2006.01) |
| *G08B 25/10* | (2006.01) |
| *G07C 5/08* | (2006.01) |

(52) U.S. Cl.
CPC ............ *B60R 25/1001* (2013.01); *B60B 3/16* (2013.01); *B60C 9/00* (2013.01); *B60R 25/1004* (2013.01); *B60R 25/24* (2013.01); *F16B 37/14* (2013.01); *F16B 41/005* (2013.01); *G07C 5/08* (2013.01); *G08B 25/008* (2013.01); *G08B 25/10* (2013.01); *B60R 2025/1016* (2013.01); *B60Y 2400/301* (2013.01); *B60Y 2400/304* (2013.01)

(58) Field of Classification Search
CPC ..... B60B 3/16; B60Q 9/00; B60R 2025/1016; B60R 25/1001; B60R 25/1004; B60R 25/24; F16B 37/14; F16B 41/005
See application file for complete search history.

(56) References Cited

U.S. PATENT DOCUMENTS

| | | |
|---|---|---|
| 4,718,282 A | 1/1988 | Bonfils |
| 5,552,759 A | 9/1996 | Stoyka |
| 7,994,901 B2 | 8/2011 | Mailis |
| 8,125,323 B2 | 2/2012 | Stephan |
| 8,525,653 B1 | 9/2013 | Bing |

(Continued)

FOREIGN PATENT DOCUMENTS

| | | |
|---|---|---|
| CA | 2 536 801 A1 | 3/2005 |
| DE | 10 2004 051 865 A1 | 11/2006 |

(Continued)

*Primary Examiner* — Omeed Alizada
(74) *Attorney, Agent, or Firm* — Brinks Gilson & Lione (57) ABSTRACT

A wheel fastener alarm is provided with a fastener body, a cap covering the fastener body, a sensor array disposed within the fastener body, and a cover disposed over an opening in the fastener body and a hole in the cap.

4 Claims, 7 Drawing Sheets

(56) References Cited

U.S. PATENT DOCUMENTS

| | | | |
|---|---|---|---|
| 8,730,036 | B2 | 5/2014 | Tsujihama |
| 8,872,668 | B2 | 10/2014 | Schnare |
| 9,085,196 | B2 | 7/2015 | Dooner |
| 2007/0222564 | A1 | 9/2007 | Kobayashi |
| 2013/0216330 | A1 | 8/2013 | Milligan |

FOREIGN PATENT DOCUMENTS

| | | |
|---|---|---|
| DE | 10 2007 015 927 A1 | 10/2008 |
| DE | 10 2011 017 604 A1 | 10/2012 |
| JP | S 61-135844 A | 6/1986 |

WHEEL FASTENER ALARM

RELATED APPLICATIONS

The present patent document claims the benefit of the filing date under 35 U.S.C. § 119(e) of Provisional U.S. Patent Application Ser. No. 62/414,444, filed Oct. 28, 2016, which is hereby incorporated by reference.

BACKGROUND

The present inventions relate generally to wheel fasteners, and more particularly, to a wheel fastener alarm.

Wheel fastener locks are used on many types of vehicles to prevent unauthorized removal and theft of vehicle wheels. Conventional wheel fastener locks require a special tool to remove the wheel fastener attached to the wheel. Thieves may circumvent the need for a special tool to remove conventional wheel fastener locks by breaking the wheel fastener off the wheel stud, such as with a strike bar. Accordingly, there is a need for an improved wheel fastener lock.

SUMMARY

A wheel fastener alarm is described, including a nut body comprising a cavity extending longitudinally through the nut body and comprising an internal thread along at least a bottom portion of the cavity; a cap disposed around a top portion of the nut body and secured to the nut body, wherein the cap has an opening in the end of the cap, the opening disposed over the cavity; a non-metallic cover disposed over the opening; and a sensor array disposed within the cavity, the sensor array including a sensor configured to detect an attribute of a wheel stud within the nut body and generate output information, a processor configured to generate a signal based on the output information, a transmitter configured to send the signal to a remote location, and a power supply configured to provide power to the sensor, processor, and transmitter.

The inventions herein may include any of the following aspects in various combinations and may also include any other aspect described below in the written description or in the attached drawings.

BRIEF DESCRIPTION OF SEVERAL VIEWS OF THE DRAWINGS

The invention may be more fully understood by reading the following description in conjunction with the drawings.

DETAILED DESCRIPTION

Figure 1:
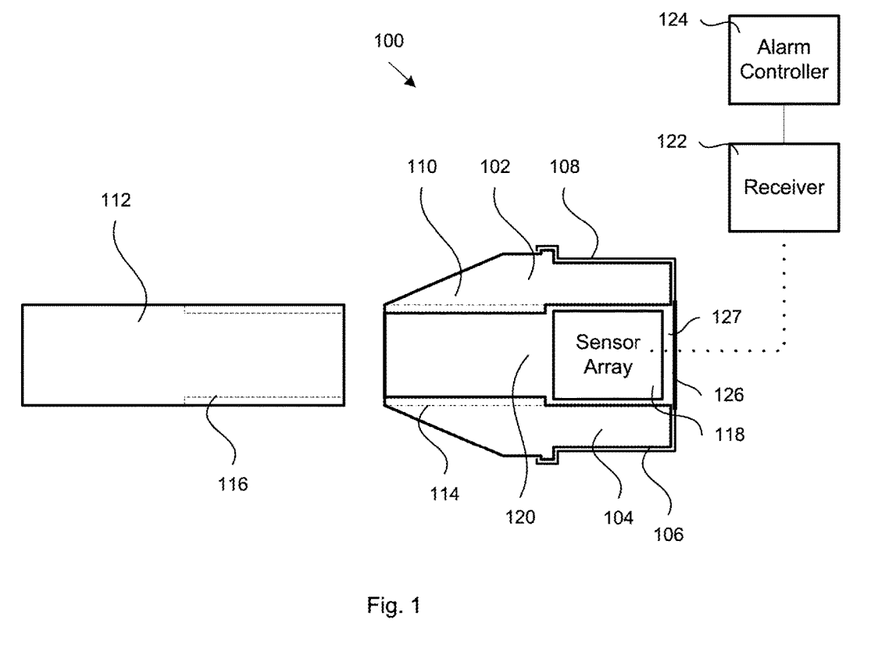
FIG. 1 is a schematic of a wheel fastener alarm.

Referring now to the figures, wheel fastener alarm 100 includes a capped automotive wheel nut 102, as shown in FIG. 1. In some embodiments, the capped automotive wheel nut 102 may be a stainless steel capped automotive wheel nut. The top portion of the nut body 104, including the wrenching surfaces 106, may be covered by cap 108 that could be made of stainless or another appropriate capping material. Thus, when the wheel nut 102 is installed on a wheel stud 112, the nut body 104 itself is not visible to casual observers, and the cap 108 is the only part of the nut that is readily visible. However, the bottom portion of the nut body 110 is not covered by the cap 108 so that the nut 102 can be threaded onto the wheel stud 112 without the cap 108 interfering with the engagement of the nut threads 114 and stud threads 116.

Wheel fastener alarm 100 also includes a sensor array 118 to detect an attribute of wheel stud 112 within wheel nut 102. The attribute may be information used to detect an alarm condition related to wheel nut 102, such as if wheel nut 102 is being removed from wheel stud 112. Attributes may include, for example, the position or location of the wheel stud within the wheel nut, an acceleration value of the wheel nut, a magnetic field around the wheel nut, shock value of wheel nut, a vibration value of the wheel nut on the wheel stud, or a temperature of the wheel nut. Sensor array 118 may be designed to fit within cavity 120 in wheel nut 102. Sensor array 118 may be integral with wheel nut 102. Wheel nut 102 may be sized similarly to a conventional wheel nut. For example, the amount of space within cavity 120 to house sensor array 118 may be a cylindrical space approximately 15 mm wide by 14 mm long. Depending on the length of wheel stud 112, the amount of available space may be reduced to approximately 9 mm. Sensor array 118 may use a variety of methods (as discussed below) to detect the attribute of wheel stud 112.

Sensor array 118 may transmit a signal to receiver 122 regarding the attribute, such as detection or lack of detection of wheel stud 112 within wheel nut 102. The signal may indicate that wheel nut 102 is attached to or detached from wheel stud 112. Accordingly, the signal may be an indication that wheel nut 102 is being removed from wheel stud 112. Receiver 122 may relay the signal to an alarm controller 124. Alarm controller 124 may be a controller for a vehicle alarm system. Accordingly, wheel fastener alarm 100 may be in communication with the vehicle's electronic systems, such as the vehicle's alarm system. Alarm controller 124 may activate the vehicle's alarm system based on the signal received from sensor array 118 regarding the status of wheel nut 102. Attempting to remove or tamper with wheel fastener alarm 100 may activate the vehicle alarm system. When wheel fastener alarm 100 is removed improperly, the vehicle alarm may generate sounds and initiate flashing lights. Similarly, if wheel fastener alarm 100 is damaged, sensor array 118 may send a signal indicating damage to alarm controller 124 through receiver 122. Alarm controller 124 may then activate the vehicle's alarm system. Additionally or alternatively, alarm control 124 may transmit a signal regarding the vehicle's alarm system to a remote device, such as a mobile phone, a tablet, or a computer. Receiver 122 and alarm controller 124 may be located remotely from wheel nut 102 and wheel stud 112, such as in a different part of the vehicle or remote from the vehicle. Receiver 122 may include CAN and LIN buses to allow receiver 122 to be used as a development platform in some applications, such as when wheel fastener alarm 100 is installed by original equipment manufacturers.

Wheel fastener alarm 100 may use distributed processing to determine if the vehicle alarm system should be activated based on the signal from sensor array 118. Wheel fastener alarm 100 may rely on alarm controller 124 to process the signal from receiver 122 to determine if the attribute measured by sensor array 118 warrants activing the vehicle alarm system based on other information not available to wheel fastener alarm 100, such as other sensors associated with the vehicle. For example, sensor array 118 may measure a temperature of wheel nut 102 that deviates from a reference value, such as being lower than a reference value, and may transmit a signal to receiver 122 indicating the measured temperature. Receiver 122 may send the signal to alarm controller 124. Alarm controller 124 may process the received signal and determine that the vehicle alarm system does not need to be activated because other sensors on the vehicle are also measuring a temperature deviation, indicating that other portions of the vehicle are at the lower temperature, as opposed to just wheel nut 102 being at a lower temperature. Other portions of the vehicle being at the lower temperature may indicate that wheel nut 102 is not being removed from the vehicle, but may indicate instead that the vehicle is in a cold location.

Wheel fastener alarm 100 may include a cover 126 placed over an opening 127 in the end of cap 108. Cover 126 may be non-conductive or non-metallic to allow the signal from sensor array 118 to pass through cover 126 and reach receiver 122. Cover 126 may, for example, be composed of a polymer. Cover 126 may include any color or pattern to provide a visual indication of the presence of wheel fastener alarm 100 in order to decrease the probability that a thief attempts to steal the wheel that wheel fastener alarm is attached to. The color may be highly visible to an observer in comparison to the vehicle wheel and remainder of wheel fastener alarm 100. For example, cover 126 may be composed of a blue colored polymer to easily show an observer that the wheel nut attached to the wheel is a wheel fastener alarm 100.

Attenuation of the signal from sensor array 118 to receiver 122 due to the metallic nature of wheel nut 102 and cap 108 may be minimized by adequately sizing opening 127 in the end of cap 108. The amount of attenuation is dependent on the size of opening 127 and can be approximated as:

Attenuation (dB)=20 log($\lambda$/2a), where $\lambda$=wavelength and a=largest opening dimension. The required transmit power can be approximated as:

Tx Power (dBm)=Rx Sensitivity (dBm)+2×antenna gain+path loss+cavity loss+vehicle attenuation.

For an approximately 7.5 mm diameter opening 127, the transmit power is estimated as:

Tx Power (dBm)=−112 dBm+(2×17 dB)+39.2 dB (at 5 meters)+33.3 dB+10 dB (estimated)

Tx Power (dBm)=4.5 dBm minimum.

Transmit power of approximately 4.5 dBm is achievable with many low power transmitters in the appropriate frequency range. The size of opening 127 may be adjusted to reduce the required transmit power.

Wheel fastener alarm 100 may be removed from wheel stud 112 without any special tools beyond the tools that are normally required to remove a conventional wheel nut. Wheel fastener alarm 100 does not require a special key, socket, or wrench to be removed. Wheel fastener alarm 100 may be designed to operate on any type of vehicle and may tolerate the environmental and operating stresses associated with being mounted on the tire/wheel assembly of any vehicle. Wheel fastener alarm 100 may be capable of operating within a temperature range of −40° C. to +85° C.

Wheel fastener alarm 100 is located on the wheel of a vehicle; accordingly, wheel fastener alarm 100 complies with design and test requirements suitable for applications associated with vehicle wheels. Wheel fastener alarm 100 is compatible with steel and aluminum wheel materials, such as high strength low allow steel, hot rolled low carbon steel, AA 356 aluminum, 6061 T6 aluminum, AA 5454 aluminum, and chrome clad wheels. Wheel fastener alarm 100 can withstand corrosion testing, such as 60 cycles of CETP: 00.00-R-311, or equivalent, without loss of function, serviceability, or significant degradation in appearance, including any galvanic contribution to degraded wheel appearance. An example matrix of tests that wheel fastener alarm 100 may pass is listed below.

| Test Description | Example Criterion |
| --- | --- |
| 100% Functional Evaluation | Full parametric characterization −40 to +85 C. |
| Shipping/Storage | −50 to +90 C. for 160 hrs |
| Low Temperature Endurance | −20 C. for 1000 hrs |
| Low Temperature Operation | −40 C. for 250 hrs |
| High Temperature Endurance | +85 C. at 85% humidity for 500 hrs |
| High Temperature Operation | +85 C. for 800 hrs |
| Powered Thermal Cycle | 500 cycles |
| Thermal Shock Resistance | 100 cycles |
| Powered Vibration | 20 hrs |
| Mechanical Shock And Drop | 10 shocks per axis, 10 drops from 1 m |
| Humidity/Temperature Cycle | −10 C. to +60 C. at 95% humidity for 250 hrs |
| Water/Fluids Ingress | IP X5 |
| Salt Mist Atmosphere | 96 hrs |
| Chemical Resistance | Various |
| Dust Test | IP 5KX |
| High Pressure Steam Jet | IP X9K |
| Thermal Shock Endurance | −40 to +85 C. for 500 hrs |
| FCC Part 15 Compliance | Various |
| EMC Compatibility/Immunity | Various |

Wheel fastener alarm 100 can be tested and programmed prior to installation on a vehicle. For example, a low power, low frequency receiver may be included in wheel fastener alarm 100 to allow testing and programming to occur on the assembly line or during service at a vehicle's dealership.

Wheel fastener alarm 100 may use sensor array 118 to detect if wheel nut 102 is loose or loosening from wheel stud 112. If sensor array 118 detects the distance between sensor array 118 and wheel stud 112 is increasing, sensor array 118 may transmit a signal to alarm controller 124 indicating that wheel nut 102 is loose or loosening from wheel stud 112. The signal may be an early indication of wheel nut 102 loosening, such that a vehicle operator may take corrective action and tighten wheel nut 102 before wheel nut 102 detaches from wheel stud 112. Similarly, wheel fastener 100 may indicate if an entire wheel is loose or loosening from a vehicle if wheel fastener 100 is installed on all the wheel studs 112 of a vehicle's wheel. If one or more wheel fastener alarms 100 are loose or loosening, alarm controller 124 may determine that the wheel is loose and may signal the vehicle operator to take corrective action.

Figure 2:
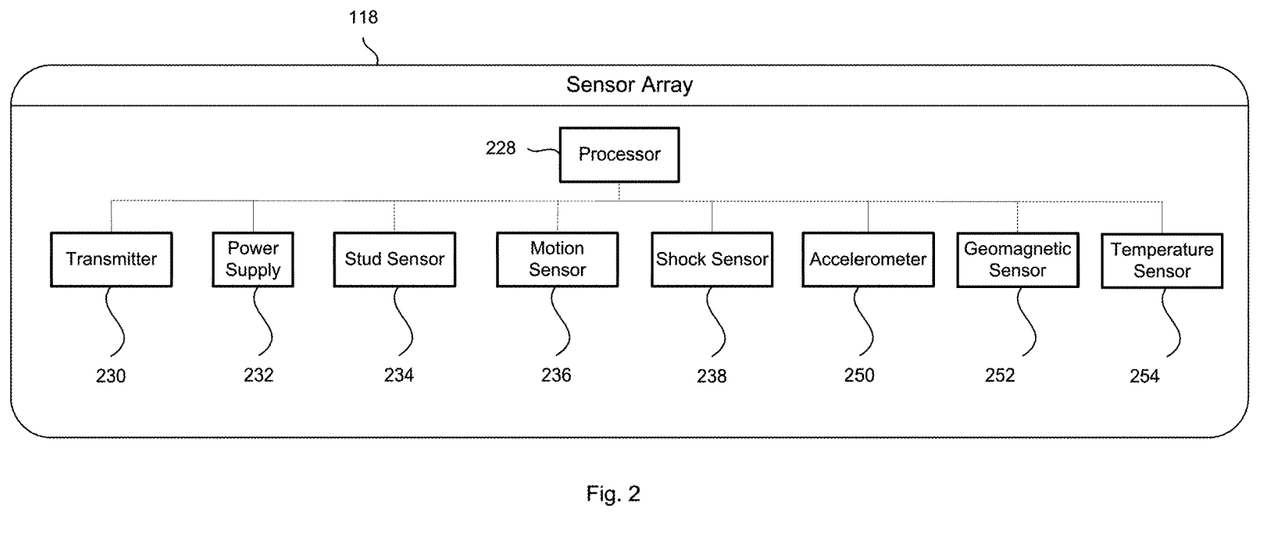
FIG. 2 is a schematic of a sensor array of a wheel fastener alarm.

Referring to FIG. 2, sensor array 118 may include components such as processor 228, transmitter 230, power supply 232, wheel stud sensor 234, motion sensor 236, shock sensor 238, accelerometer 250, geomagnetic sensor 252, and temperature sensor 254.

Processor 228 may be implemented as a microprocessor, microcontroller, application specific integrated circuit (ASIC), discrete logic, or a combination of other types of circuits or logic. Numerous options exist for processor 228. For example, processor 228 may be a Microchip PIC16LF1824T39A family of microcontrollers that include integrated radio frequency transmitters. Processor 228 may be a Infineon SP370-25-106-0, a Freescale FXTH871511DT1, or a Melexis MLX91801. Freescale FXTH71511DT1 may be the best of the integrated chip solutions, but may be more expensive than other options. The Microchip PIC16LF1824T39A may provide a low cost solution with ample radio frequency output power, low frequency receive capability for service, the ability to auto arm/disarm in original equipment manufacturer applications, and other options to reduce system power consumption. Microchip PIC16LF1824T39A may also interface easily with the sensors used in wheel fastener alarm 100.

Power supply 232 may include a replaceable or rechargeable source of power, such as one or more batteries. The power supply 232 may be sufficient to power wheel fastener alarm 100 for many years and in some instances approximately 10 years. Additionally or alternatively, power supply 232 may be sufficient to power wheel fastener alarm 100 for the amount of time it typically takes for a vehicle carrying wheel fastener alarm 100 to travel approximately 100,000 miles. Power supply 232 may fit in a cylindrical space approximately 12 mm in diameter and 5 mm deep. Alternative spaces for power supply 232 may also be used. Power supply 232 may be a custom designed battery or may be an off the shelf battery, such as a CR1225 coin cell battery. Power supply 232 may be a rechargeable lithium-ion battery that is charged remotely, such as by a low frequency receiver. Sensor array 118 may include additional circuitry and software to regulate charging power supply 232. Additionally or alternatively, an external charging station may be used.

wirelessly send a signal to a remote location, such as receiver 122, regarding the position of wheel stud 112 within wheel nut 102. As discussed previously, the vehicle's alarm system may activate if wheel stud sensor 234 does not detect wheel stud 112 within wheel nut 102. Processor 228 may also periodically utilize transmitter 230 to transmit a signal indicating that wheel stud 112 is located within wheel nut 102 and confirm that wheel fastener alarm 100 is operational.

Transmitter 230 may communicate with the vehicle's alarm system using the existing vehicle systems, such as the tire pressure management system or remote keyless entry system. Communication with the vehicle's systems may utilize the vehicle's low power radio frequency data link at approximately 315 MHz or 434 MHz. The use of existing vehicle communication systems by wheel fastener alarm 100 may not interfere with existing vehicle systems because wheel fastener alarm 100 may transmit most often when the existing vehicle systems are not transmitting. For example, the tire pressure management system transmits most often when the vehicle is moving, whereas wheel fastener alarm 100 may only transmit when the vehicle is stationary. Additionally or alternatively, a separate radio frequency receiver may be used to establish communication between transmitter 230 and the vehicle's systems.

Wheel stud sensor 234 may use a variety of methods to detect the position of wheel stud 112 within wheel fastener alarm 100. The table below provides characteristics for capacitive, magnetic, inductive, and optical methods of detection.

| Description | Design Requirement | Capacitive | Inductive Hall Effect | Inductance to Digital Converter | Optical |
|---|---|---|---|---|---|
| Equipment | | Microchip PIC16LF1824T39A | TI DRV5013 and Microchip | TI LDC1101DR | AMS TMD 27723 |
| Package Size | | N/A (part of control IC) | L: 2.9 mm W: 2.37 mm H: 1 mm Plus Magnet | L: 3 mm W: 3 mm H: 0.9 mm | L: 3.94 mm W: 2.36 mm H: 1.35 mm |
| Field Type | | Electric | Magnetic | Magnetic | Light |
| Detection Range | 1-5 mm | 0-1.7 mm | 1-3.5 mm | 0-4.5 mm | 1-15 mm |
| Supply Voltage | 2.5-3.0 VDC | 1.8-3.6 VDC | 2.5-5.5 VDC | 1.71-3.46 VDC | 2.6-3.6 VDC |
| Supply Current (Active) | | 35 uA | 2.7 mA | 3.2 mA | 12.5 mA |
| Detection Time | | 20 us | 50 us | 2 ms | 2.8 ms |
| Wake From Sleep | Desirable | Yes | Possibly | No | Yes |
| Emitter/Detector Type | | PCB Trace | Magnet/IC | PCB Trace | LED |
| I/O Control Pins Required | | 2 | 2 | 5 | 4 |
| Complexity | | Low | High (requires custom design magnet) | Low | Low |
| Operating Temperature Range | | −40 C. to +85 C. | −40 C. to +85 C. | −40 C. to +85 C. | −30 C. to +85 C. |
| Base Cost (IC only) | | $0 (part of control IC) | $0.29/3000 (excluding magnet) | $2.99/3000 | $1.15/2500 |

Wheel stud sensor 234 may detect the position of wheel stud 112 within wheel nut 102. The position of wheel stud 112 within wheel nut 102 may be determined with an accuracy of approximately 1 mm. Wheel stud sensor 234 may transmit a signal to processor 228 regarding the detection or lack of detection of wheel stud 112 within wheel nut 102. Processor 228 may then utilize transmitter 230 to Capacitive proximity sensors produce an electric field and can be used to sense a variety of materials such as metal, solids, liquids, or the human hand. Introducing an object into the electric field results in a change in capacitance that is measurable. A capacitive sensor can be implemented using PCB traces combined with a capacitor and series resistor as the sensing element. Only two processor pins are required for control resulting in a very inexpensive solution. In addition to the low cost and component count, capacitive proximity sensors consume very little power. Experiments with capacitive proximity sensors using a 5 mm PCB sensing element demonstrate a maximum detection range of a wheel stud in a wheel nut of 1.7 mm. Larger sensing elements increase the detection range. However, the nut body in close proximity to the larger sensing element may have the effect of shorting the electric field. This may make it difficult to differentiate between the wheel stud and the wheel nut, so the wheel stud position cannot be detected reliably. The shorting effect can be mitigated somewhat by the choice of a sensing element with small geometry relative to the wheel nut size. This smaller sensing element significantly affects range, resulting in a maximum detection of approximately 1.7 mm with a 5 mm sensing element. While the capacitive sensing method could normally be used to reliably detect the stud, the presence of the fastener body may make it impractical. One possible improvement would be the use of a less ferrous material such as stainless steel for the wheel nut body.

Magnetic (Inductive Hall Effect) sensors vary their output voltage in response to a magnetic field. The common implementation, such as a proximity switch, simply senses the presence of the field generated by a magnet. More complex implementations are possible where metallic objects in close proximity alter the magnetic field and cause a measurable change to the output voltage of the sensor. Operation of the sensor is dependent upon characteristics of the magnetic materials and lot to lot distribution of the magnets along with the physical placement of the magnet, electronics, and object being detected in the final system. Magnetic sensors are unaffected by harsh environments and can have a very long service life. Placing a magnet on the wheel stud so it can be easily detected by the Hall Effect element may present problems for use with wheel fastener alarm 100 due to the service aspect where the magnet could be damaged or the wheel fastener alarm 100 inadvertently installed on the wrong wheel stud. If the magnet were incorporated with the electronics, concerns may include the available packaging space, achieving the necessary spacing and geometry to detect the wheel stud properly, and the ability to calibrate out the effects of the wheel fastener body.

Inductive sensors typically utilize an oscillator in combination with a resonant LC (inductor-capacitor) coil as a means for sensing the presence of an object such as metal. The magnetic field radiated by the coil induces eddy currents in the conductive object which alters the oscillator performance. This performance change is directly related to the distance between the metal object and the LC coil. As an example of an inductive sensor, the TI LDC1101 can simultaneously measure the impedance and resonant frequency of an LC resonator with very high resolution allowing it to sense the proximity and movement of conductive materials. By monitoring the amount of power injected into the resonator, the LDC1101 determines the equivalent parallel resistance of the resonator which it returns as a digital value. It also measures the oscillation frequency of the LC circuit by comparing the sensor frequency to a reference frequency which can then be used to determine the inductance of the LC circuit. Tests show that presence of the wheel stud within the wheel nut is detectable over an approximately 1-4.5 mm range using the LDC1101. Calibration of the inductive sensor may be required to minimize the effects of the wheel nut body on detecting the wheel stud. Given the low component count and ability to compensate for the effects of the fastener body, an inductive sensor may be a good solution for sensing the position of the wheel stud. A further advantage is that the LDC1101 will operate to approximately 1.8V. If paired with the PIC16LF1824T39A processor option, the potential for significant reduction in current consumption is possible.

Optical sensors may have the potential for best detection range when sensing the wheel stud. For example, the AMS TMD 27723 integrates a highly focused LED light source and detector that will provide an approximately 15 mm sensing range. A primary concern with optical sensing is dust, dirt, or debris in the wheel nut cavity. Reflections from the inside wall of the wheel nut must also be accounted for with the possibility that the walls would require a non-reflective coating. In the case of the TMD 27723, current consumption at the lowest intensity setting is significantly more than other sensing options, which may require a custom power supply.

Motion sensor 236 may inhibit the wheel stud 112 sensing function of wheel fastener alarm 100 when the vehicle is in motion. Additionally or alternatively, motion sensor 236 may prevent transmitter 230 from sending a signal regarding the status of wheel stud 112 or may instruct alarm controller 124 to disregard the signal when the vehicle is in motion. Wheel fastener alarm 100 may only be activated and/or operate to signal theft of a wheel when the vehicle is parked. Accordingly, wheel fastener alarm 100 may automatically not be used when the vehicle is in motion and may automatically arm when the vehicle is stationary. Restricting the use of wheel fastener alarm 100 to when the vehicle is stationary may decrease power consumption. Motion sensor 236 may be a ball bearing type switch to sense motion to arm/disarm wheel fastener alarm 100. A ball bearing style sensor has the advantage of being used in other vehicular applications and having low power consumption. Motion sensor 236 may also be an accelerometer to detect when wheel fastener alarm 100 is moving.

In addition or alternative to motion sensor 236, wheel fastener alarm 100 may be armed or disarmed based on the presence of a keyfob for the vehicle. Similar to the unlock/lock functions of the vehicle's doors, the presence of a keyfob within an adequate distance of the vehicle may arm/disarm wheel fastener alarm 100. For example, if the owner of the vehicle has the keyfob near the vehicle, wheel fastener alarm 100 may automatically be disarmed to allow the owner to remove wheel fastener alarm 100 from wheel stud 112, such as to change a tire, without setting off the vehicle's alarm system.

Wheel fastener alarm 100 may also be armed/disarmed through a remote device, such as a mobile phone, a tablet, or a computer. A user may also be able to determine the status of wheel fastener alarm 100 through a remote device, such as if it is operating properly or if it has initiated an alarm signal. Wheel fastener alarm 100 may also automatically inform a user through the remote device that an alarm signal has been initiated.

Additionally or alternatively, wheel fastener alarm 100 may include a low frequency receiver that receives a signal from a low frequency initiator associated with the tire pressure management system in the vehicle. The signal could instruct wheel fastener alarm 100 to arm or disarm. For example, the presence of the vehicle's keyfob may be detected by the tire pressure management system and the tire pressure management system may then send a signal to wheel fastener alarm 100 indicating the presence of the keyfob. Wheel fastener alarm 100 may then automatically disarm.

Additionally or alternatively, wheel fastener alarm 100 may be armed or disarmed manually from inside the vehicle, such as by a switch, to allow removal of the vehicle's wheels for any reason, such as tire replacement, tire rotation, or tire repair. Additionally or alternatively, wheel fastener alarm 100 may be automatically armed after the vehicle is stationary for a predetermined time period, such as a number of minutes or other time period.

Shock sensor 238 may detect if wheel fastener alarm 100 is being removed by force, such as being broken off with a strike bar used to shear off wheel nut 102. The shock may be sensed as an overdamped vibration present on three axes (x, y, z). Tests show that the shock felt by wheel fastener alarm 100 from a strike bar or similar tampering force may last approximately 200 ms. Accordingly, shock sensor 238 may sample wheel fastener alarm 100 for force/vibration every 200 ms in order to detect a tampering force/vibration. The duration of the sampling/detection time may be extended based on ringing that may occur in wheel fastener alarm 100 after the tampering force/vibration or may be extended based on the vibration that occurs after wheel fastener alarm 100 falls to the ground as a result of a tampering force/vibration. Using an accelerometer for shock sensor 238 may require a high power capacity if a force/vibration sample is required approximately every 200 ms. Shock sensor 238 may be required to consume very low power in order to extend the operating life of wheel fastener alarm 100. Accordingly, shock sensor 238 may be a ball bearing sensor, such as the SignalQuest SQ-MIN-200, that provides simple switch closures and is implemented carefully with interrupt pins.

Accelerometer 250 may detect tampering with wheel fastener alarm 100 by detecting movement or a change in position of wheel nut 102. Processor 228 may use sensor array 118, or some other means, to ascertain a reference position of wheel nut 102, such as a position defined by X, Y, and Z coordinates, at the time wheel fastener alarm 100 is armed. Processor 228 may periodically ascertain the current position of wheel nut 102 and compare it to the reference position. Wheel fastener alarm 100 may activate the vehicle alarm system if the current position does not match the reference position within a predefined amount.

Geomagnetic sensor 252 may detect tampering with wheel fastener alarm 100 by detecting a change in the magnetic field around wheel nut 102. Geomagnetic sensor 252 may measure a reference magnetic field around wheel nut 102 at the time wheel fastener alarm 100 is armed. Processor 228 may periodically compare a current magnetic field around wheel nut 102 with the reference magnetic field to detect if a magnetic object, for example a lug wrench, is being applied to wheel nut 102. Wheel fastener alarm 100 may activate the vehicle alarm system if the current magnetic field differs from the reference magnetic field by a predefined amount.

Temperature sensor 254 may detect tampering with wheel fastener alarm 100 by detecting a change in temperature around wheel nut 102. Processor 228 may periodically compare a current temperature measured by temperature sensor 254 around wheel nut 102 with the reference temperature to detect a change in temperature. A temperature change may indicate that wheel nut 102 is being subjected to extreme temperatures in an effort to remove wheel nut 102 from wheel stud 112, such as by heating wheel nut 102 up with a blowtorch or freezing wheel nut 102 with dry ice. Extreme temperature changes may make it easier to remove wheel nut 102 from wheel stud 112. Wheel fastener alarm 100 may activate the vehicle alarm system if the current temperature differs from the reference temperature by a predefined amount.

The arrangement and packaging of the components of sensor array 118 into wheel nut 102 are robust enough to provide protection to wheel fastener alarm 100 such that wheel fastener alarm 100 can detect a tampering force/vibration and send a signal indicating a tampering force/vibration is occurring before becoming irreparably damaged. For example, cap 108 and cover 126 provide enough protection to the components within wheel nut 102 to detect a tampering force/vibration before wheel fastener alarm 100 is rendered inoperable. The arrangement and packaging of the components of sensor array 118 into wheel nut 102 are also robust enough to prevent damage to wheel fastener alarm 100 and its components from the shock of an impact wrench being used to remove wheel fastener alarm 100. Sensor array 118 may be seated within a plastic housing located in wheel nut 102 in order to easy assembly and to reduce the shock and vibration experienced by sensor array 118. Additionally or alternatively, a flexible potting compound or liquid silicon rubber may be used for shock reduction.

An embodiment of wheel fastener alarm 100 cannot be disarmed by any external command or communication method in order to prevent unintended disarming of the system, such as by hacking, tampering, or other altering of the system. Because this embodiment of wheel fastener alarm 100 cannot be disarmed, an alarm condition of this embodiment of wheel fastener alarm 100 will only activate the vehicle alarm system if the vehicle alarm system is in the armed state. Accordingly, this embodiment of wheel fastener alarm 100 is always armed, but will only activate the vehicle alarm system if the vehicle alarm system is armed.

Figures 3A, 3B:
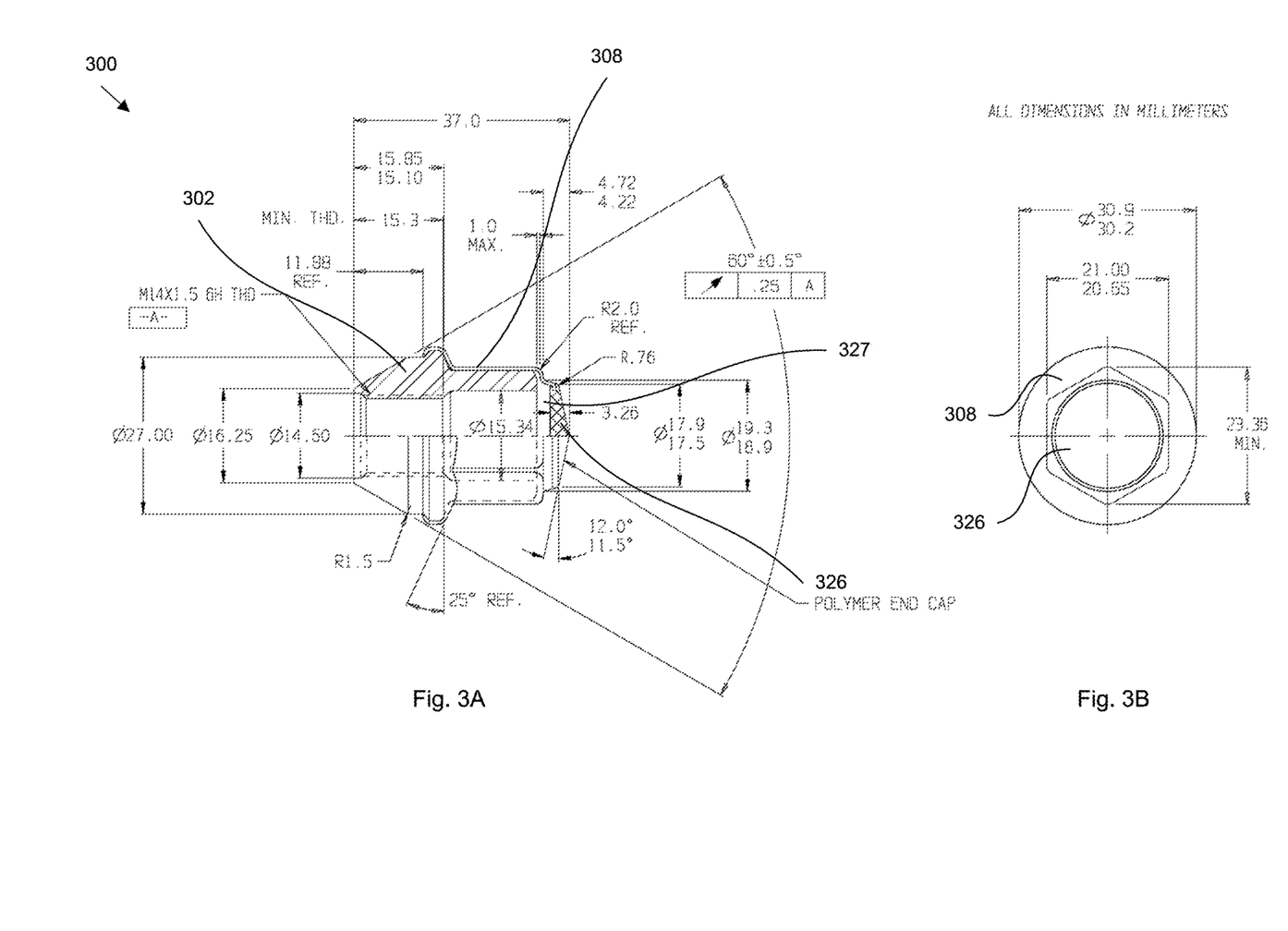
FIGS. 3A and 3B are a side cross-sectional view and an end view of a capped wheel nut of a wheel fastener alarm.

Referring to FIG. 3, FIG. 3A is a side cross-sectional view of an embodiment of wheel fastener alarm 300, including wheel nut 302, cap 308, opening 327, and cover 326. FIG. 3B is an end view of wheel fastener alarm 300, showing cap 308 and cover 326. Wheel fastener alarm 300 may include all the components and features of wheel fastener alarm 100. Cover 326 may have a greater thickness at its center portion than its edge portions to provide protection to components contained within wheel nut 302. The dimensions shown in FIG. 3 may be varied to suit the application of wheel fastener alarm 300.

Figure 4A:
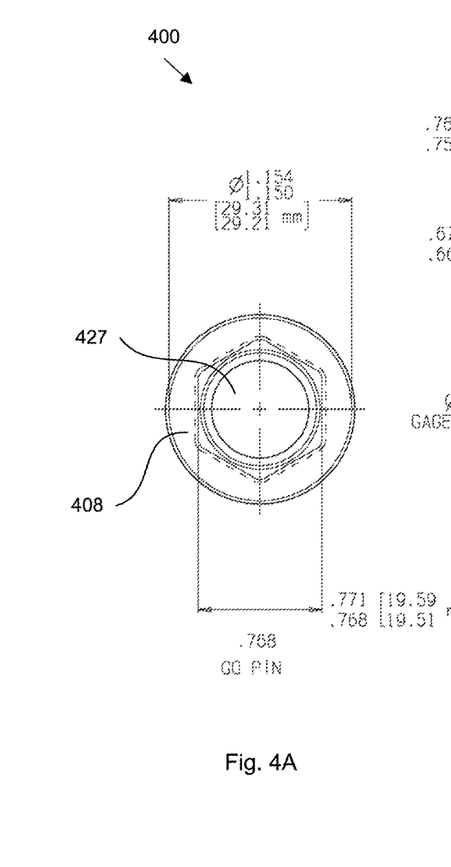
FIGS. 4A-4C are end and side views of a wheel nut cap of a wheel fastener alarm.
Figure 4B:
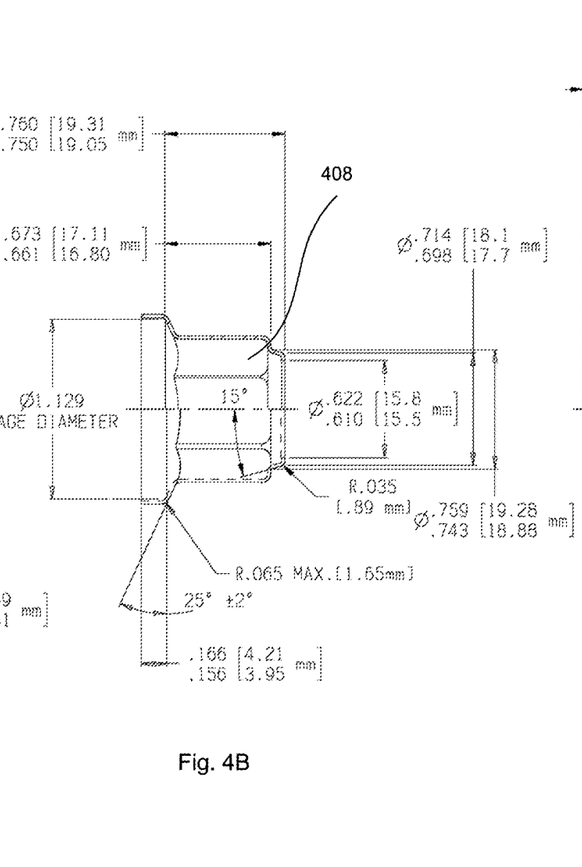
Figure 4C:
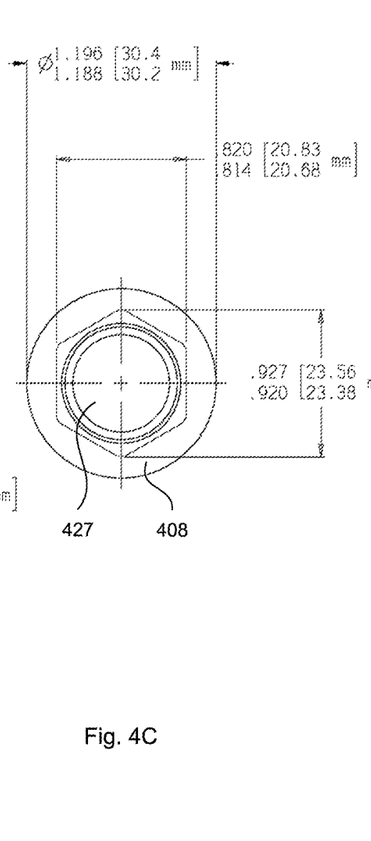

Referring to FIG. 4, FIG. 4A is an end view of an embodiment of wheel fastener alarm 400, including cap 408 and opening 427. FIG. 4B is a side view of cap 408. FIG. 4C is an end view of cap 408 and opening 427. Wheel fastener alarm 400 may include all the components and features of wheel fastener alarm 100. The dimensions shown in FIG. 4 may be varied to suit the application of wheel fastener alarm 400.

Figure 5:
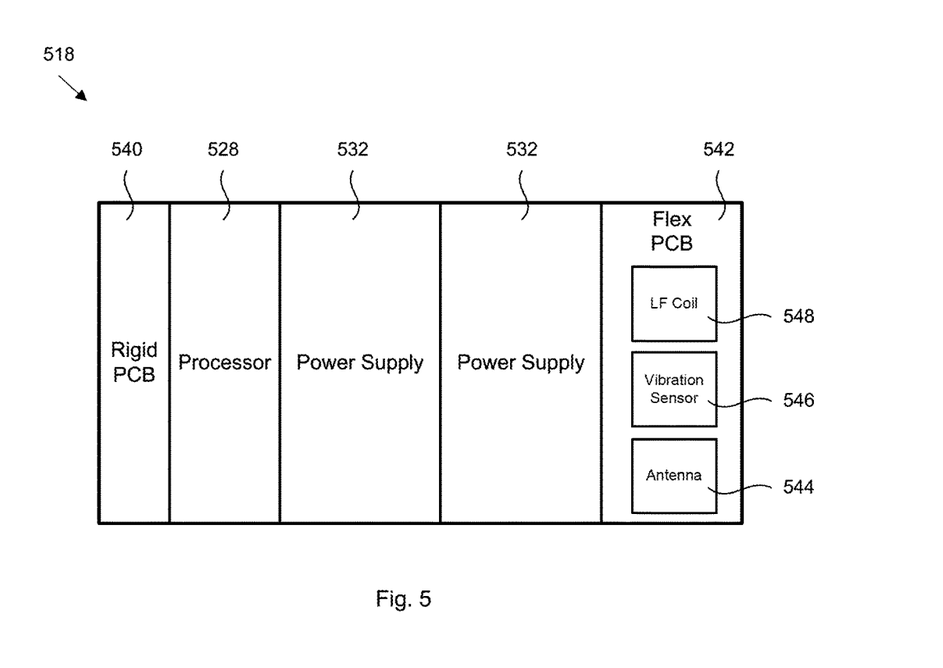
FIG. 5 is a schematic of a sensor array of a wheel fastener alarm.

FIG. 5 is a schematic of a sensor array 518 of an embodiment of a wheel fastener alarm. Wheel fastener alarm 500 may include all the components and features of wheel fastener alarm 100. Sensor array 518 includes a rigid-flex PCB assembly. Rigid PCB 540 may be positioned near wheel stud 512 (not shown). Flex PCB 542 may be positioned near cover 526 (not shown) in order to optimize the performance of antenna 544. Processor 528 may be located on rigid PCB 540. Sensor array 518 may utilize one or more power supplies 532 to operate. FIG. 5 shows two power supplies 532 located between rigid PCB 540 and flex PCB 542. The power supplies 532 may be the same or different. For example, both power supplies 532 may be CR1225 coin cell batteries. Power supply 532 may be any off the shelf or custom designed battery. Sensor array 518 may also include vibration sensor 546. Vibration sensor 546 may combine the components and features of motion sensor 236 and shock sensor 238 discussed above. Vibration sensor 546 may be a ball bearing switch. Sensor array 518 may include LF (low frequency) coil 548, which may, for example, be similar to a Coilcraft 4513TC-725XGLB RFID transponder coil.

Figure 6:
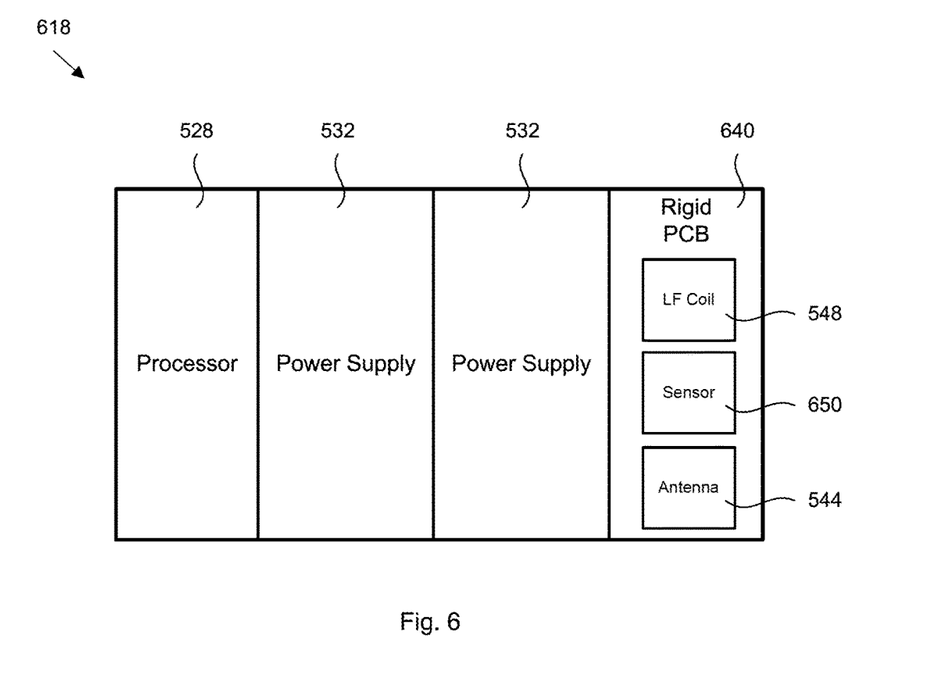
FIG. 6 is a schematic of a sensor array of another wheel fastener alarm.

FIG. 6 is a schematic of a sensor array 618 of an embodiment of a wheel fastener alarm. Wheel fastener alarm 600 may include all the components and features of wheel fastener alarm 500. Sensor array 618 may include only a rigid PCB 640 and may not include a flex PCB. Sensor array 618 may include sensor 650. Sensor 650 may be any type of sensor used to detect attributes related to wheel nut 102, such as, for example, a stud position/location sensor, a motion sensor, a shock sensor, an acceleration sensor, a geomagnetic sensor, and a temperature sensor. The other components of sensor array 618 may be the same as sensor array 518.

Figure 7:
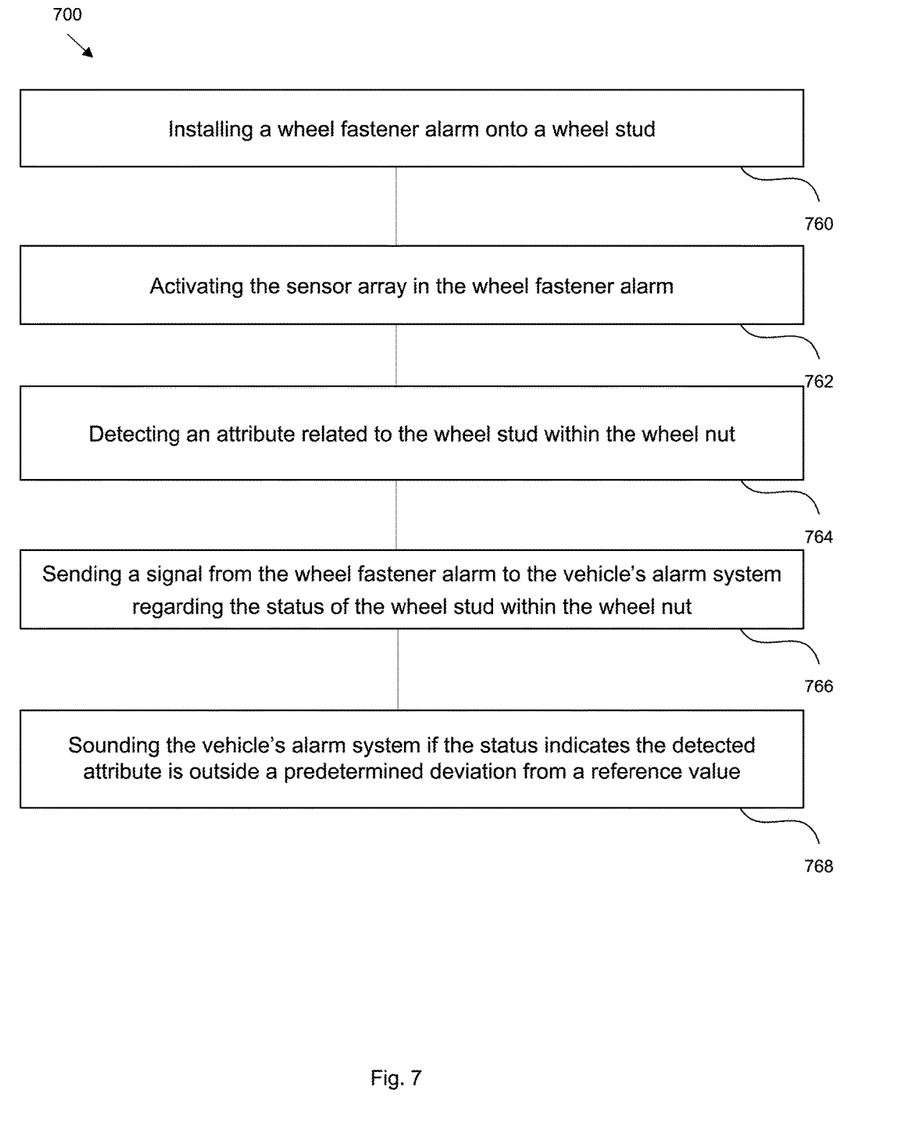
FIG. 7 is a flow chart of a method of operating a wheel fastener alarm.

FIG. 7 shows a flow chart of a method 700 of operating a wheel fastener alarm. The wheel fastener alarm used in conjunction with method 700 may have the same components and features as wheel fastener alarm 100. The flow of method 700 may begin with step 760 by installing a wheel fastener alarm onto a wheel stud, such as by interlocking the threads on the wheel nut in the wheel fastener alarm with the corresponding threads on the wheel stud. Step 762 may include activating the sensor array in the wheel fastener alarm. Step 764 may include detecting an attribute to determine an alarm condition related to the wheel stud. Attributes may include the position of the wheel stud within the wheel nut, an acceleration value of the wheel nut, a magnetic field around the wheel nut, shock value of wheel nut, a vibration value of the wheel nut on the wheel stud, or a temperature of the wheel nut. Step 766 may include sending a signal from the wheel fastener alarm to the vehicle's alarm system regarding the status of the wheel stud within the wheel nut. The status may be determined by comparing the detected attribute with a reference value. Step 768 may include sounding the vehicle's alarm system if the status indicates that the detected attribute is outside a predetermined deviation from the reference value. The alarm may indicate that the wheel stud is not within the wheel nut. Such an alarm may indicate that the wheel of the vehicle is being stolen.

Methods or processes may be implemented, for example, using a processor and/or instructions or programs stored in a memory. Specific components of the disclosed embodiments may include additional or different components. A processor may be implemented as a microprocessor, microcontroller, application specific integrated circuit (ASIC), discrete logic, or a combination of other types of circuits or logic. Similarly, memories may be DRAM, SRAM, Flash, or any other type of memory. Parameters, databases, and other data structures may be separately stored and managed, may be incorporated into a single memory or database, or may be logically and physically organized in many different ways. Programs or instruction sets may be parts of a single program, separate programs, or distributed across several memories and processors.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A wheel fastener alarm comprising:
   a nut body comprising a cavity extending longitudinally through the nut body and comprising an internal thread along at least a bottom portion of the cavity;
   a cap disposed around a top portion of the nut body and secured to the nut body, wherein the cap has an opening in the end of the cap, the opening disposed over the cavity;
   a non-metallic cover disposed over the opening; and
   a sensor array disposed within the cavity, the sensor array comprising:
      a sensor configured to detect an attribute of a wheel stud within the nut body and generate output information,
      a processor configured to generate a signal based on the output information,
      a transmitter configured to send the signal to a remote location, and
      a power supply configured to provide power to the sensor array;
   wherein the sensor array further comprises a motion sensor, wherein the motion sensor is configured to detect when the wheel fastener alarm is moving, wherein the sensor is disabled when the motion sensor detects the wheel fastener alarm is moving.

2. The wheel fastener alarm of claim 1, wherein the sensor is disabled when the motion sensor detects the wheel fastener alarm is moving and the processor does not generate the signal based on the output information from the sensor when the motion sensor detects the wheel fastener alarm is moving.

3. The wheel fastener alarm of claim 1, wherein the motion sensor is a ball bearing switch.

4. A wheel fastener alarm comprising:
   a nut body comprising a cavity extending longitudinally through the nut body and comprising an internal thread along at least a bottom portion of the cavity;
   a cap disposed around a top portion of the nut body and secured to the nut body, wherein the cap has an opening in the end of the cap, the opening disposed over the cavity;
   a non-metallic cover disposed over the opening; and
   a sensor array disposed within the cavity, the sensor array comprising:
      a sensor configured to detect an attribute of a wheel stud within the nut body and generate output information,
      a processor configured to generate a signal based on the output information,
      a transmitter configured to send the signal to a remote location, and
      a power supply configured to provide power to the sensor array;
   wherein the wheel fastener alarm is configured not to send the signal to the remote location when the wheel fastener alarm is near a keyfob associated with a vehicle that wheel fastener alarm is attached to.

* * * * *